Figure 1:
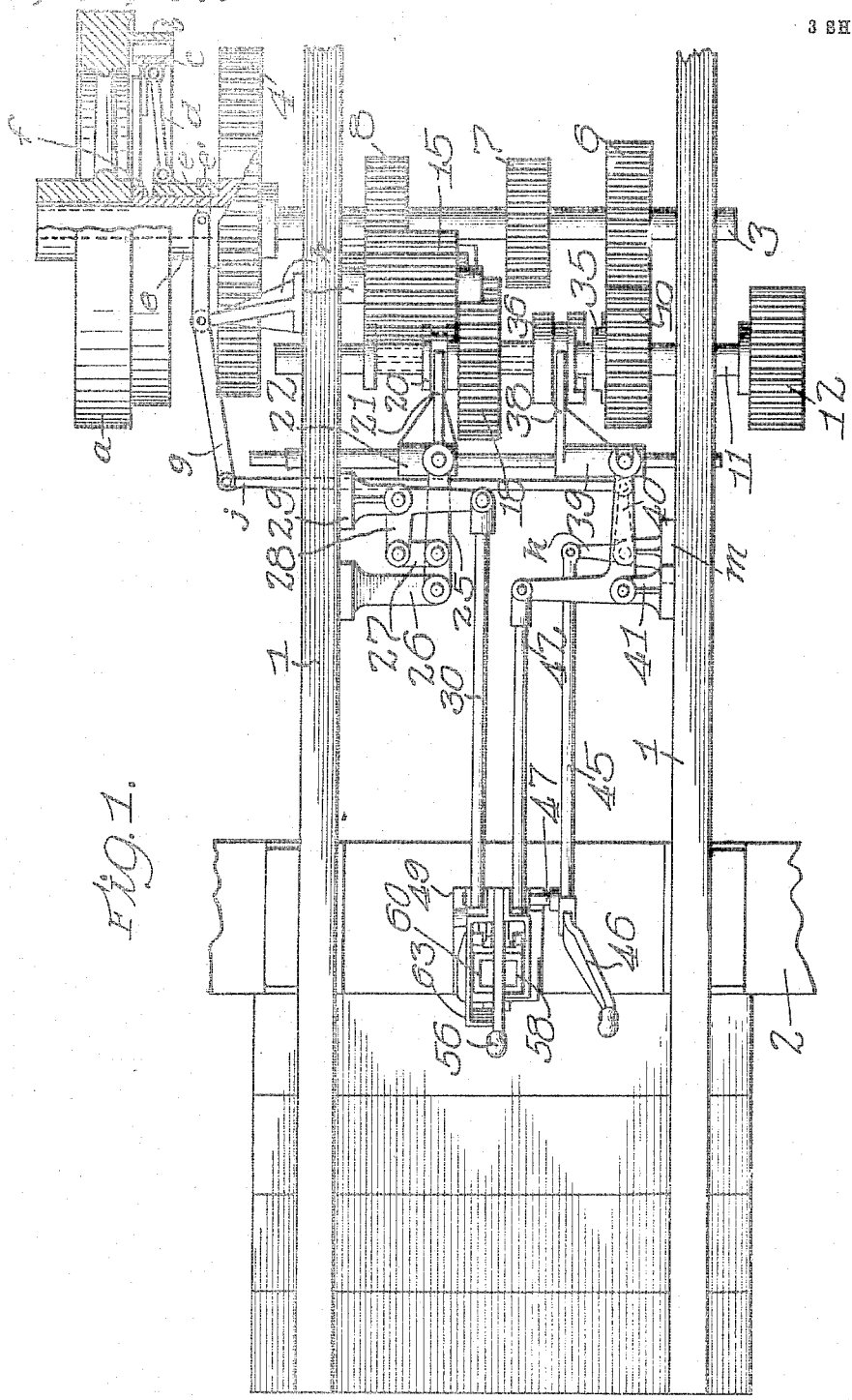

R. C. TOWNSEND.
VARIABLE SPEED MECHANISM.
APPLICATION FILED AUG. 2, 1912.

1,098,697.

Patented June 2, 1914.

3 SHEETS—SHEET 1.

Witnesses:
Inventor:
Roy C. Townsend
By Cheever & Cox
Attys.

R. C. TOWNSEND.
VARIABLE SPEED MECHANISM.
APPLICATION FILED AUG. 2, 1912.
1,098,697.
Patented June 2, 1914.
3 SHEETS—SHEET 2.
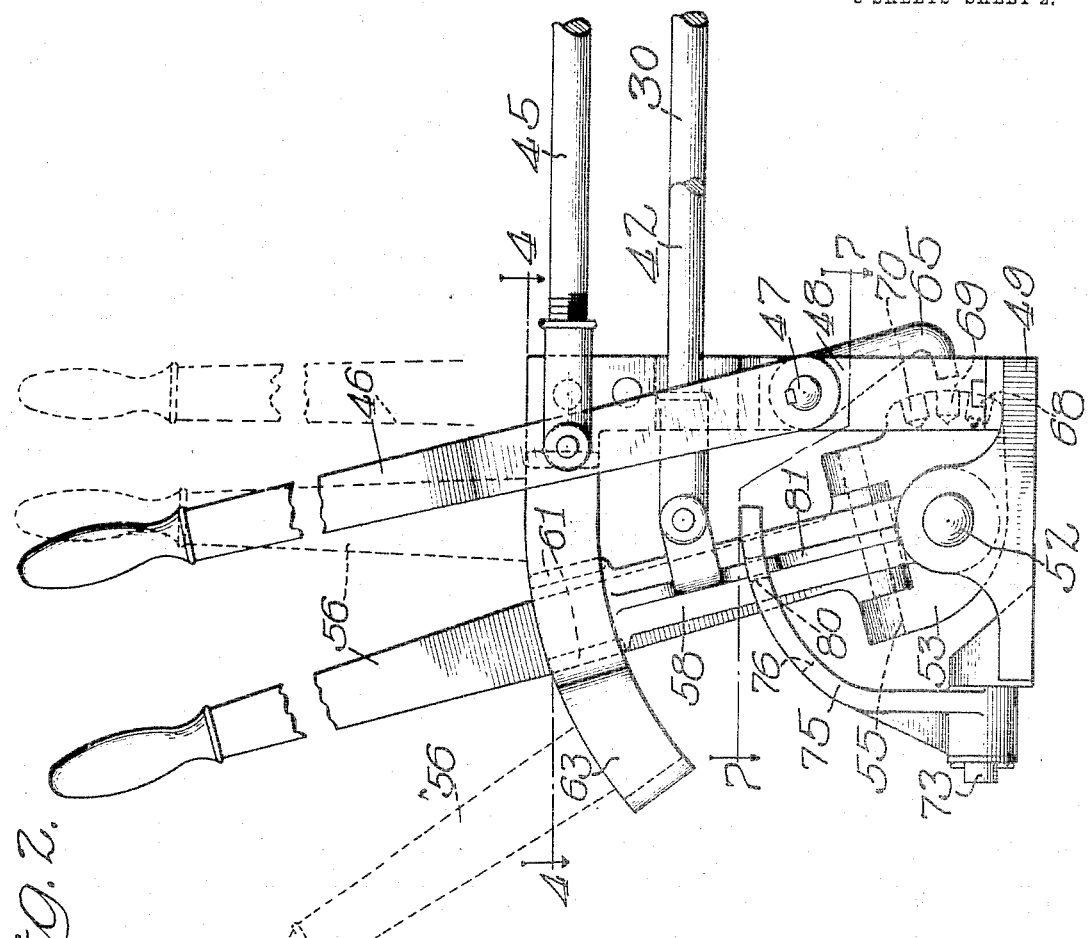
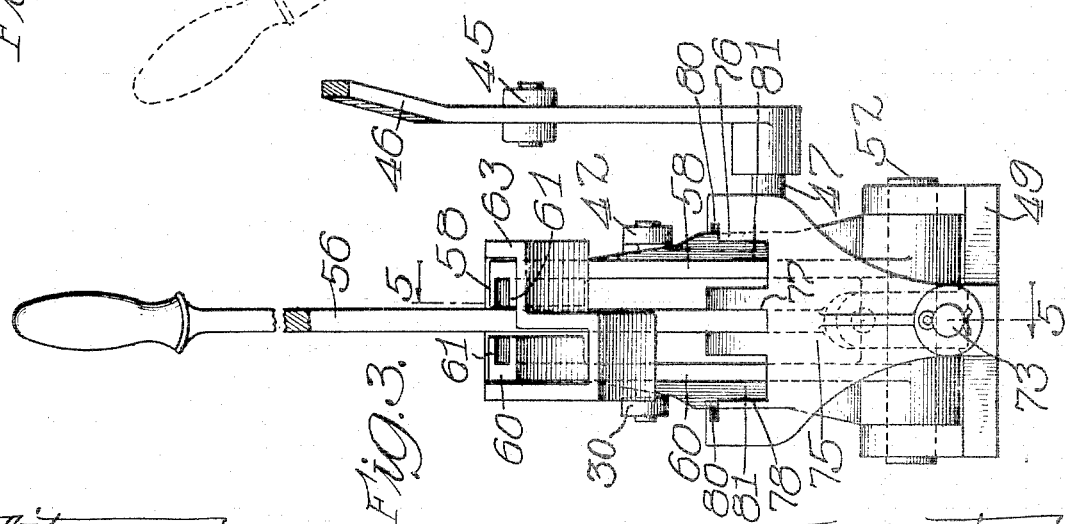
Witnesses:
G. W. Demarus Jr.
R. Bauerle
Inventor:
Roy C. Townsend
By Cheever & Cox
Attys.

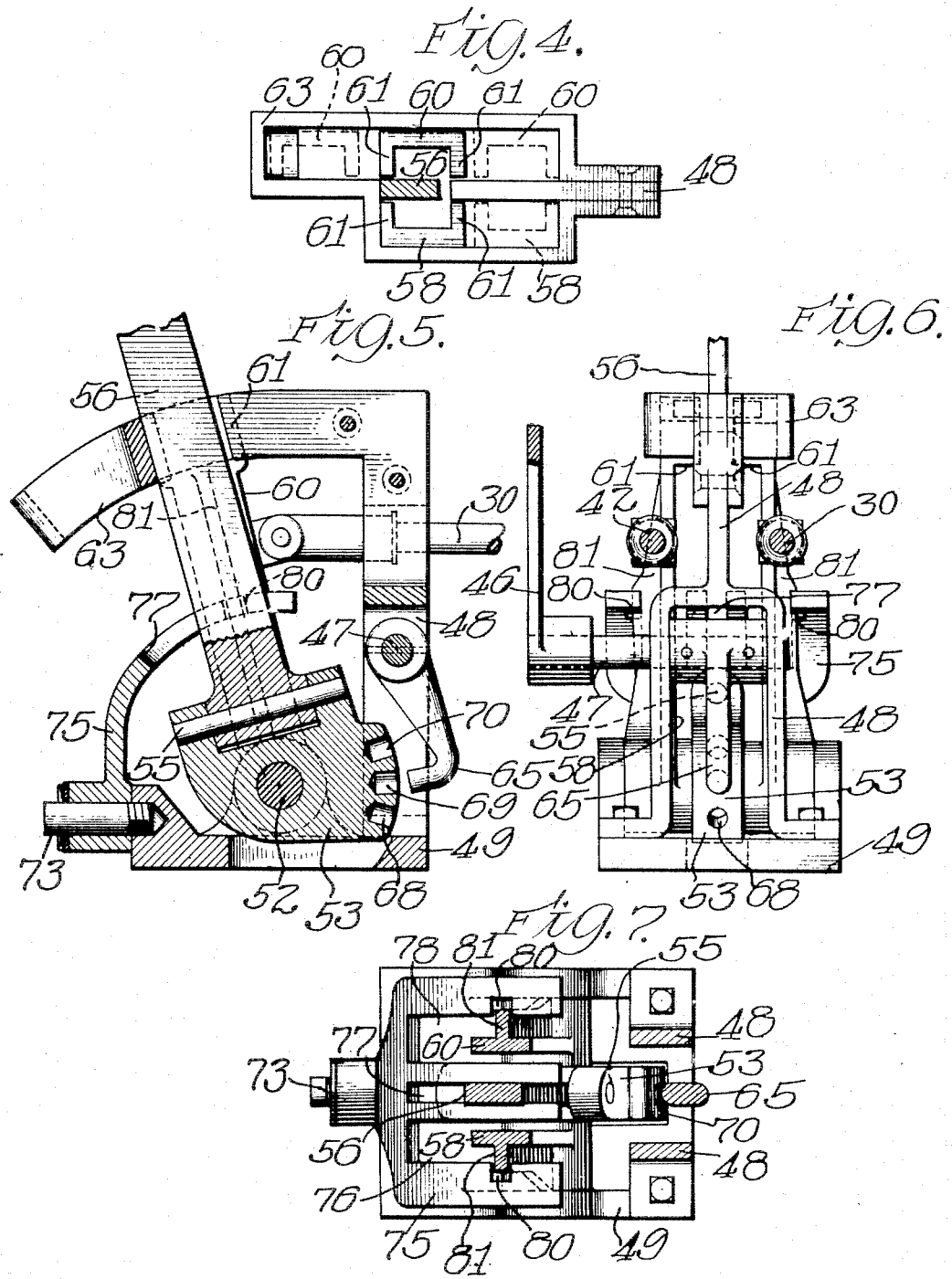

UNITED STATES PATENT OFFICE.

ROY C. TOWNSEND, OF BELOIT, WISCONSIN, ASSIGNOR TO FAIRBANKS, MORSE & COMPANY, OF CHICAGO, ILLINOIS, A CORPORATION OF ILLINOIS.

VARIABLE-SPEED MECHANISM.

1,098,697.  Specification of Letters Patent.  Patented June 2, 1914.

Application filed August 2, 1912. Serial No. 712,989.

*To all whom it may concern:*

Be it known that I, ROY C. TOWNSEND, a citizen of the United States, residing at Beloit, in the county of Rock and State of Wisconsin, have invented a certain new and useful Improvement in Variable - Speed Mechanism, of which the following is a specification.

My invention relates to variable speed mechanism, more especially for use as the transmission of self propelled vehicles including traction engines.

My invention resides more particularly in the operating means whereby the transmission gears and clutch are controlled; and the general object of the invention is to provide a completely interlocking apparatus substantially incapable of misoperation.

More specifically, my objects are, first, to provide mechanism so constructed that the operator can not throw the load on the gears until the latter are in proper location. This insures that the full width of the teeth will be utilized, thus avoiding the danger of stripping the gears. Second, to provide a positive lock to hold the gears in their proper places while the clutch is in. Third, to provide means other than the friction clutch whereby the engine may be disconnected from the drive wheels in case the clutch fails to release. The purpose is to avoid accidents which sometimes happen when the clutch sleeve becomes dry and seizes the shaft, or a piece of waste or other substance gets between the clutch and the friction ring. Fourth, to provide a construction in which the parts may be securely locked in their various positions without the use of small pins, springs, latches, or the like.

To illustrate my invention I have selected a form especially adapted for traction engines, and in the accompanying drawings, which form a part of this specification, Figure 1 is a plan view of gearing and controlling mechanism embodying my invention. Fig. 2 is a side elevation of the hand levers and connected parts. Fig. 3 is an end elevation of the parts shown in Fig. 2. Fig. 4 is a plan section taken on the line 4—4 Fig. 2. Fig. 5 is a sectional elevation taken on the line 5—5 Fig. 3. Fig. 6 is an end elevation of the parts shown in Fig. 5. Fig. 7 is a plan section on the line 7—7 Fig. 2.

Similar numerals refer to similar parts throughout the several views.

Referring first to the assembly view, Fig. 1, the beams 1 form part of the vehicle frame work and support the platform 2. The main shaft 3 is supported upon said beams and is driven by any suitable source of power, for example, an explosion engine (not shown) connected to the gear wheel 4. A friction clutch is provided in connection with the engine so that the same may be disconnected at will; and while the precise form may be varied, as devices of this character are old, I have shown a device in which $a$ represents the engine fly wheel provided with a clutch ring $b$ inside of which are shoes $c$ operated by arms $d$. Said arms are articulately connected to a sleeve $e$ splined upon the hub $f$ of wheel 4. Sleeve $e$ is shifted by means of a collar $e'$ fitting loosely in an annular groove in said sleeve and operated by a shifting lever $g$ fulcrumed upon a bracket $h$ bolted to the side of one of the beams 1. Lever $g$ is operated by a rod $j$ connected to a bell crank $k$ pivotally mounted upon a bracket $m$ secured to one of the beams 1. Crank $k$ is operated by the rod 45 and lever 46 hereinafter described. The construction is such that when the handle of lever 46 is moved forward toward the gear wheels, the shoes $c$ will engage the ring $b$ and cause the wheels $a$ and 4 to rotate in unison and when said lever is moved in the opposite direction, the shoes will release the ring and permit the wheel 4 to stand still.

Rigidly secured to shaft 3 are three pinions 6, 7 and 8. Pinion 6 is for high speed and meshes directly with the gear 10 which is loose on countershaft 11. Said countershaft is supported from the beams 1 and is provided with a wheel 12 which delivers the power as required. Pinion 8 meshes with a wide face gear 15 supported upon a jack shaft 16 carried by one of the beams 1. A shifting gear 18 is mounted upon a square portion of shaft 11 and is therefore slidable lengthwise of said shaft and yet rotates the shaft whenever the gear is rotated. When said sliding gear is shifted into mesh with pinion 7, the countershaft will be rotated at low speed, and whenever said gear is shifted into mesh with the wide face gear 15, shaft 11 will rotate in reverse direction. The sliding gear 18 is shifted by means of a collar 20 engaged by the fingers 21 projecting from a sleeve 22 slidingly mounted upon a rod 23 carried by the beams 1. Sleeve 22 is shifted by a lever 25 fulcrumed upon a stationary bracket 26 and connected by a link 27 to a crank 28 fulcrumed upon a stationary bracket 29 and connected at its free end to a connecting rod 30. The construction is such that when rod 30 is pushed forward (toward the right Fig. 1) gear 18 will be shifted into mesh with pinion 7 and drive shaft 11 at low speed, while if rod 30 is pulled backward it will shift gear 18 into mesh with the wide face gear 15 and rotate shaft 11 in the reverse direction. If gear 18 is shifted into intermediate position as shown in Fig. 1, it will be out of mesh with gear wheels 7 and 15. This will be referred to as neutral position.

Gear wheel 10 above mentioned has a hub 35 adapted to interlock with a collar 36 sliding upon the squared portion of shaft 11. The parts 35 and 36 constitute a jaw clutch and serve to transmit rotation to the shaft 11 from the wheel 10 when interlocked. Collar 36 is shifted by the fingers 38 of a sleeve 39 slidable upon the rod 23. Said sleeve is shifted by a crank 40 fulcrumed upon a stationary bracket 41. The free end of said crank is connected to a connecting rod 42. The parts are so constructed that when rod 42 is pushed forward (toward the right, Fig. 1) the parts of the jaw clutch will engage and transmit rotation. When said rod is pulled back the parts of the clutch will be disengaged as shown in Fig. 1. A third rod 45 is connected to the friction clutch hereinabove described. Rod 45 is operated by a hand lever 46 fulcrumed upon the rock shaft 47 mounted in the standard 48 rising from a base 49 as shown in detail in Figs. 2, 3, 5 and 6.

I will now describe the interlocking operating mechanism by which the rods 30, 42, and 45 are controlled. A shaft 52 is mounted horizontally in base 49 and forms a fulcrum or axle for block 53. A pivot shaft 55 is mounted in block 53 transversely to shaft 52 and forms a hinge pin by which hand lever 56 is connected to block 53. As a result of this construction the upper end of lever 56 may be swung laterally about the pin 55 as a center, while a fore and aft movement of said lever will produce a rocking movement of the block 53 about its shaft 52. Extending upward on each side of lever 56, parallel thereto, is an arm, the one on the right being marked 58 and the one on the left 60, the view being taken as in Fig. 3. It will be understood that the operator normally stands upon the platform 2 with his hands upon the levers and his face toward the shifting gears previously described. The lever 46 will thus be at the right and the lever 56 at the left, and for convenience the relative positions of the parts will be thus described. Said arms 58, 60 are loosely mounted upon shaft 52 on opposite sides of the block 53 and are prevented from moving laterally (that is, lengthwise of the shaft) by said block and by the standards 4. At or near their upper ends arms are adapted to interlock with the lever 56. In the form selected to illustrate the invention they are provided with ears 61 adapted to engage the lever as best illustrated in Figs. 3 and 4. When viewed in plan as in Fig. 4 the arms with their ears present the appearance of three sides of a rectangle opening toward the lever. The levers may thus be said to be provided with holders opening toward the lever. When the lever has been introduced into either of these holders, a fore or aft movement of the lever will produce a corresponding movement of the arm upon which the holder is formed. The arm 58 is articulately connected to the high speed connecting rod 42 while the arm 60 is articulately connected to the low speed and reverse connecting rod 30.

The holders 61 at the upper ends of the arms 58, 60 are guided in their movement by an irregularly shaped element 63, which for convenience may be referred to as a quadrant. Said quadrant is concentric with shaft 52 and according to the present arrangement is carried by the standard 48 at the upper end thereof. Said quadrant has two compartments as clearly shown in Fig. 4, the compartment at the right containing the holder of the arm 58 and the compartment at the left containing the holder at the upper end of arm 60. The right compartment is long enough to permit arm 58 to occupy two positions, while the left compartment is long enough to permit the arm 60 to occupy three positions. The neutral position is shown in Fig. 4 in full line while the acting positions are shown in dotted lines. When the right arm 58 is thrown forward from neutral position the mechanism will be on high gear. When the left arm 60 is thrown forward from neutral position mechanism will be on the low gear and when thrown backward from neutral position the mechanism will be on reverse gear. In the present form my mechanism provides for only high, low and reverse but it will be understood by those skilled in the art that an additional high speed might readily be provided for by making the two compartments of the quadrant of equal length and adding a pair of reduction gears to the shafts 3 and 11. It will be noted by referring to the drawings that when lever 56 is in central position laterally it can not be moved any appreciable distance either forward or backward, the movement being limited by the quadrant. When said lever is in central position laterally and its rear edge is in contact with the quadrant it will be locked laterally by the two rear ears of the holders at the upper end of the arms 58, 60. Under these conditions the lever will be standing obliquely upward and backward as shown in full lines in Fig. 2 and hence gravity will tend to hold the lever in this position, which may be termed the central neutral position. It will be further noted by referring to Fig. 4 that when the lever has entered one of the holders and has been moved either forward or backward from neutral position, it will be held interlocked with the holder by the aid of the quadrant. Consequently, except when the lever is in neutral position and the wheels are all out of gear there is no possibility of the lever becoming disengaged from the arm which it is operating; and conversely the lever can not leave an arm until it has brought the latter to neutral position. At neutral position the lever may be swung laterally into engagement with either of the arms, but at all other times will be interlocked therewith. The gear controlling lever 56 may be said to be capable of occupying three stations or positions considered from front to rear, to-wit, neutral, forward, and back; also that it is capable of occupying three positions laterally, to-wit, central, left and right.

It has been previously explained that the friction clutch lever 46 which operates the rod 45 which connects and disconnects the engine with the main gear wheel 4 is mounted upon the rock shaft 47. A dog 65, clearly shown in Figs. 2 and 5 is operated by said lever 46. In the preferred construction both the dog and lever are keyed or otherwise rigidly secured to said shaft. The block 53 hereinabove mentioned is provided with three recesses 68, 69, 70 arranged one above another in a vertical line and each adapted to receive the nose of said dog and thereby lock the block against rotation about the shaft 52. The parts are so proportioned and constructed that when the dog is in the recess 69 the gear shifting lever 56 will be held in neutral position shown in the full lines of Fig. 2; and when said dog is in the recess 70 the lever will be in forward position and when said dog is in the recess 68 the lever will be in back position. The parts are so arranged that unless the lever 56 has fully reached one of its three stations (neutral, forward or back) the friction clutch lever 46 will not be able to enter any one of the recesses 68, 69, 70 but will be locked out by the contiguous portions of block 53. When thus locked out lever 46 will be held in non-acting position as shown in full lines in Fig. 2 under which conditions the friction clutch will be pulled out, and the engine and gear 4 will be disconnected. Consequently the friction clutch can be thrown in only when the gear shifting lever 56 is at one of its three proper stations and the respective gears either in full mesh or completely out of mesh. Furthermore so long as the friction clutch is in action the lever 46 which controls it will, through the agency of the dog 65 and the block 52, lock the lever 56 against fore and aft movement. The result is that when the gears are rotating they can not be shifted and when they are being shifted they are of necessity disconnected from the engine or other source of power, and the machine is incapable of misoperation. This, among other things, avoids the danger of stripping the gears.

I will now describe the means for locking the arm 58 when the lever 56 is in engagement with the arm 60 and vice versa. A stud 73 projects rearwardly from base 49 and forms a pivot for a locking frame 75. The upper portion of said frame is concentric with shaft 52 and has three slots 76, 77, 78 as shown in plan in Fig. 7. The central slot 77 receives the lever 56 in such manner as to permit said lever to rotate freely about the shaft 52 and at the same time cause said locking frame to be moved laterally in unison with said lever. Notches 80 are formed in the outer branches of said frame in position to receive the ribs 81 formed on the outer sides of the arms 58, 60. The parts are so formed that when the locking frame is thrown to the left it will release the arm 60 and simultaneously lock the arm 58 by causing the notch in branch 75 to fit over the rib on said arm 58. Conversely, when the lever and frame are swung to the right, the arm 58 will be released and the arm 60 will be locked. Thus in my mechanism a positive lock is provided so that the arm which is temporarily out of use will have no opportunity of being accidentally moved from its proper position. There can be, therefore, no interference between the different parts of the gear shifting mechanism and only one of the connecting rods 30, 42 can be in acting position at any given time.

As the function and operation of the various elements of my mechanism have been heretofore described, it will be unnecessary to repeat the same. It will be sufficient to summarize by saying that complete control is afforded through the two hand levers 56 and 46, lever 46 controlling the friction clutch which connects the engine to the transmission gearing and lever 58 controlling the gear shifting mechanism. For the reason hereinabove given these levers are so interlocked that no shifting can occur when the clutch is "in" and the clutch can not be thrown in unless the gear shifting lever has brought the gearing to full operative position.

Having thus described my invention, what I claim as new and desire to secure by Letters Patent is:

1. In transmission gearing, change speed gear wheels, a plurality of independent pivoted arms for controlling them to obtain different speeds, a locking frame adapted to engage either of said arms one at a time, a hand lever adapted to engage either of said arms one at a time for operating them, said hand lever operating said locking frame and causing it to temporarily release the arm which is temporarily engaged by said hand lever, and a clutch operating lever adapted to lock said hand lever when said clutch lever is in "in" position and release said hand lever when said clutch lever is in "out" position.

2. In combination, change speed transmission gear wheels, clutch mechanism for turning on and off the power, two independently movable arms adapted to control said gear wheels to produce the various speeds, a gear lever located between said arms and adapted to engage therewith when moved toward them from central position, said lever being also movable longitudinally from neutral position for operating said arms, a locking frame movable laterally in unison with said gear lever and adapted to lock a given arm as the lever moves away from it and to release the opposite arm as the lever moves toward the same, and a clutch lever adapted to lock the clutch mechanism and adapted to lock said gear lever when the clutch lever is in "in" position and to release said gear lever when said clutch lever is in "out" position.

3. In a change speed transmission gearing, change speed gear wheels, two independently movable arms adapted to operate one at a time and to control said gear wheels to produce the various speeds, a gear lever located between said arms adapted to engage therewith when moved toward them from central position, said lever being also movable longitudinally from neutral position for operating said arm, and a locking frame for locking one of said arms and simultaneously releasing the other and vice versa, said locking frame being pivotally mounted, and movable laterally in unison with said gear lever and immovable longitudinally.

4. In transmission gearing, change speed gear wheels, a plurality of independent pivoted arms longitudinally movable and capable of controlling said gear wheels for producing different speeds, a gear lever adapted to engage one of said arms and simultaneously release the other, and vice versa, a locking frame adapted to engage one of said arms and simultaneously release the other, and vice versa, said locking frame being operated by said hand lever and being moved by it to engage the arm which is out of engagement with the lever, a pivotally mounted block whereon said gear lever is pivotally supported, the axis of the block and the axis of the lever lying in planes perpendicular to each other, and a clutch operating lever adapted to engage said block for locking it and the lever against longitudinal movement.

5. In transmission gearing, change speed gear wheels, a plurality of independent pivoted arms movable longitudinally and capable of controlling said gear wheels for producing different speeds, a laterally movable locking frame adapted to engage one of said arms and simultaneously release the other and vice versa, a gear lever adapted to engage with either of said arms, one at a time, a block whereto said lever is pivotally connected for permitting the lever to swing laterally into and out of engagement with said arms, said lever being adapted to move said locking frame laterally for operating it, said locking block being pivotally supported to thereby afford longitudinal rotary movement of said block and lever, clutch mechanism, and a clutch lever adapted to operate said clutch mechanism, said clutch lever being adapted to lock said block against longitudinal rotary movement.

6. In transmission gearing, change speed gear wheels, a plurality of independent, pivoted gear operating arms longitudinally movable to a plurality of stations and capable of controlling said gear wheels for producing different speeds, a laterally movable locking frame adapted to engage one of said arms and simultaneously release the other, and vice versa, a gear lever adapted to engage with either of said arms, one at a time, a block whereto said lever is pivotally connected for permitting the lever to swing laterally into and out of engagement with said arms, said lever being adapted to move said locking frame laterally for operating it, said locking block being pivotally supported to thereby afford longitudinal rotary movement of said block and lever, clutch mechanism and a clutch lever adapted to operate said clutch mechanism, said block having a plurality of sockets, and said clutch lever having a detent adapted to enter said socket for holding the gear lever and consequently the gear operating arms at different stations.

7. In transmission gearing, change speed gear wheels, a plurality of independent, pivoted gear operating arms longitudinally movable to a plurality of stations and capable of controlling said gear wheels for producing different speeds, a laterally movable locking frame adapted to engage one of said arms and simultaneously release the other, and vice versa, a gear lever adapted to engage with either of said arms, one at a time, a block whereto said lever is pivotally connected for permitting the lever to swing laterally into and out of engagement with said arms, said lever being adapted to move said locking frame laterally for operating it, said locking block being pivotally supported to thereby afford longitudinal rotary movement of said block and lever, clutch mechanism and a clutch lever adapted to operate said clutch mechanism, said block having a plurality of sockets, and said clutch lever having a detent adapted to enter said socket for holding the gear lever and consequently the gear operating arms at different stations, the portions of the block between the sockets being adapted to lock out said detent and thereby hold the clutch lever in "out" position.

8. In a change speed transmission gearing, the combination, with the change speed gear wheels of two independently movable arms adapted to be operated one at a time for controlling said wheels, a lever located between said arms, said arms having ears for engaging said lever, said lever being movable laterally from central position to engage with one or the other of said arms, and said lever being also movable longitudinally from neutral position for operating said arms and a quadrant wherein said arms travel longitudinally, said lever when in central neutral position being laterally locked between the ears of said arms and longitudinally locked in one direction by said quadrant.

9. In a change speed transmission gearing, change speed gears, two independently movable arms adapted to be moved longitudinally one at a time to control said gears, said arms having ears, a source of power, clutch mechanism adapted to connect said gears with said source of power, a longitudinally movable lever located between said arms and movable laterally for engaging and disengaging the ears on said arms, said ears being also adapted to lock the lever between them to hold the lever in central position laterally when the lever is in neutral position longitudinally, and means operated by said clutch mechanism for preventing longitudinal movement of said lever from neutral position thereof.

10. In a change speed transmission gearing, change speed gears, two independently movable arms adapted to be operated one at a time and capable of controlling said gears to produce the various speeds, a source of power, clutch mechanism adapted to connect said transmission gearing with said source of power, a lever located between said arms, said arms having ears extending toward said lever for engaging it, said lever being movable laterally from central position to engage with one or the other of said arms, said lever being also movable longitudinally from neutral position for operating said arms, a quadrant wherein said arms travel longitudinally, said lever when in central neutral position being laterally locked between the ears of said arms and longitudinally locked in one direction by said quadrant, and means operated by said clutch mechanism for preventing longitudinal movement of said lever in the opposite direction when in central neutral position.

11. In a change speed transmission gearing, gear wheels, two independently movable arms adapted to be operated one at a time and capable of controlling said wheels to produce the various speeds, said arms having ribs on the outside, a locking frame straddling said arms and having notches adapted to fit over the ribs in said arms to lock the arms against longitudinal movement, a lever laterally movable into and out of engagement with said arms, said frame being laterally movable in unison with said lever to lock one of said arms and simultaneously release the other and vice versa, said lever being movable longitudinally for operating said arms.

12. In a change speed transmission gearing, change speed gear wheels, two independently movable arms adapted to be operated one at a time and capable of controlling said wheels to produce the various speeds, said arms having ribs on the outside, a pivoted locking frame straddling said arms and having notches adapted to fit over the ribs in said arms to lock the arms against longitudinal movement when swung toward them, a lever laterally movable into and out of engagement with said arms, said lever being longitudinally movable to operate said arms, and said locking frame having a slot in which said lever travels longitudinally independently of said locking frame the sides of the slot fitting said lever whereby the lateral movement of said lever produces a corresponding lateral movement of said locking frame.

13. In combination, a source of power, transmission gearing, a clutch mechanism for connecting and disconnecting said gearing with and from said source, said transmission gearing including two laterally shiftable elements movable independently of each other to produce the various speeds, an arm for each of said shifting elements for controlling the same, a lever located between said arms and laterally movable toward and from them for engaging and disengaging them, said lever being also movable longitudinally for operating said arms, a quadrant adapted to hold said arms and lever in engagement when said arms are in acting position, locking means to prevent longitudinal movement of said lever, said locking means being operated by said clutch mechanism and adapted to lock said lever against longitudinal movement when the clutch is in and release said lever when the clutch is out, and a pivotally mounted locking frame adapted to move laterally into and out of engagement with said arms, the lateral position of said frame being determined by the lateral position of said lever.

In witness whereof, I have hereunto subscribed my name in the presence of two witnesses.

ROY C. TOWNSEND.

Witnesses:
GEO. B. INGERSOLL,
F. Z. FAUQUIER.